Dec. 5, 1967  P. W. DRYLAND ET AL  3,356,578
NUCLEAR REACTOR
Filed April 4, 1966  9 Sheets-Sheet 4
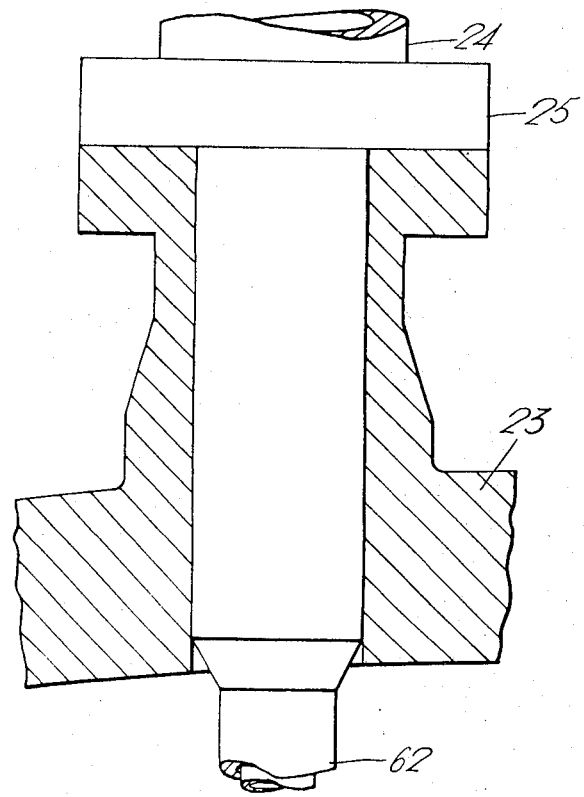
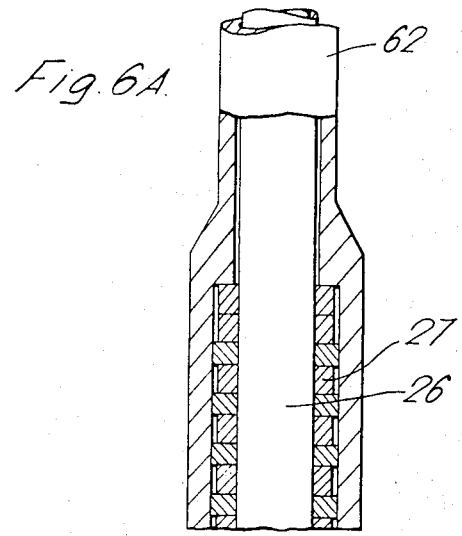
Fig. 6A.

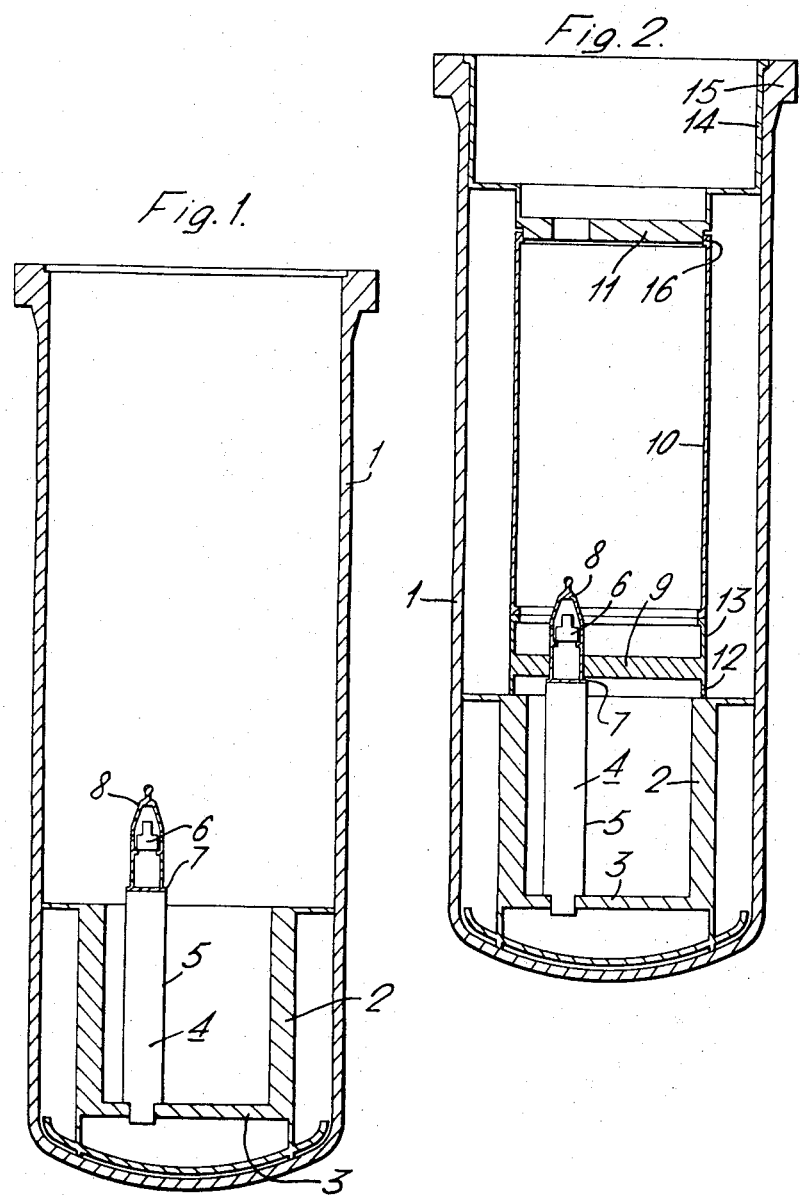

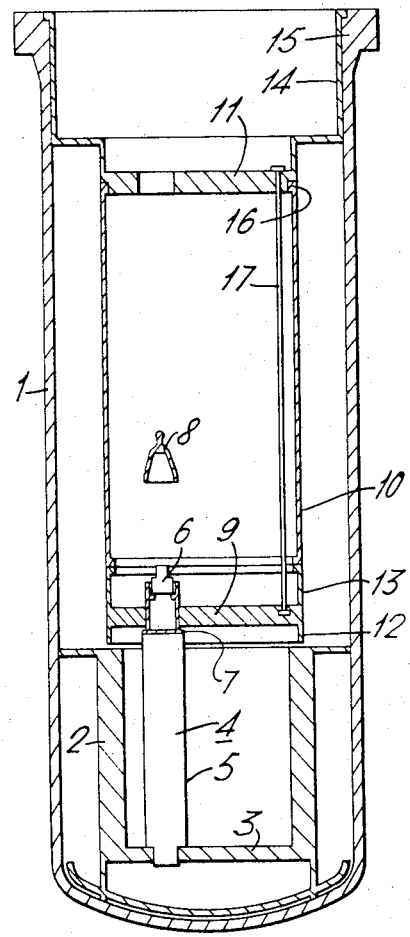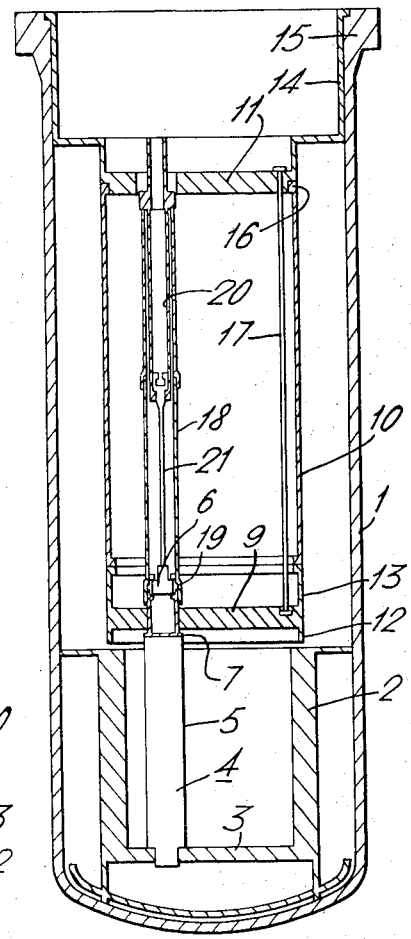

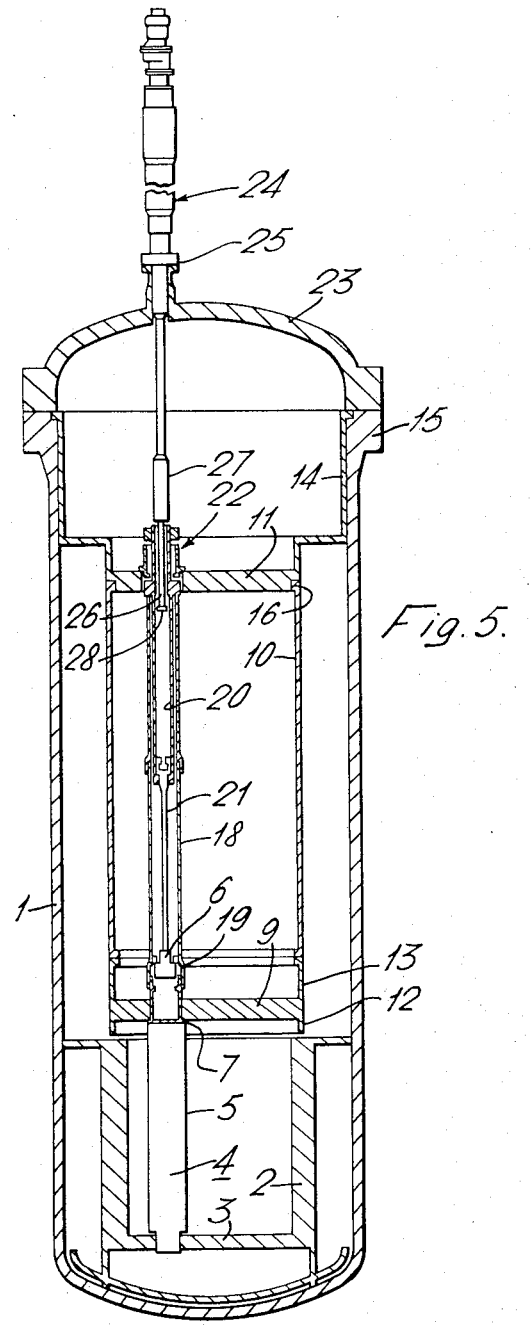

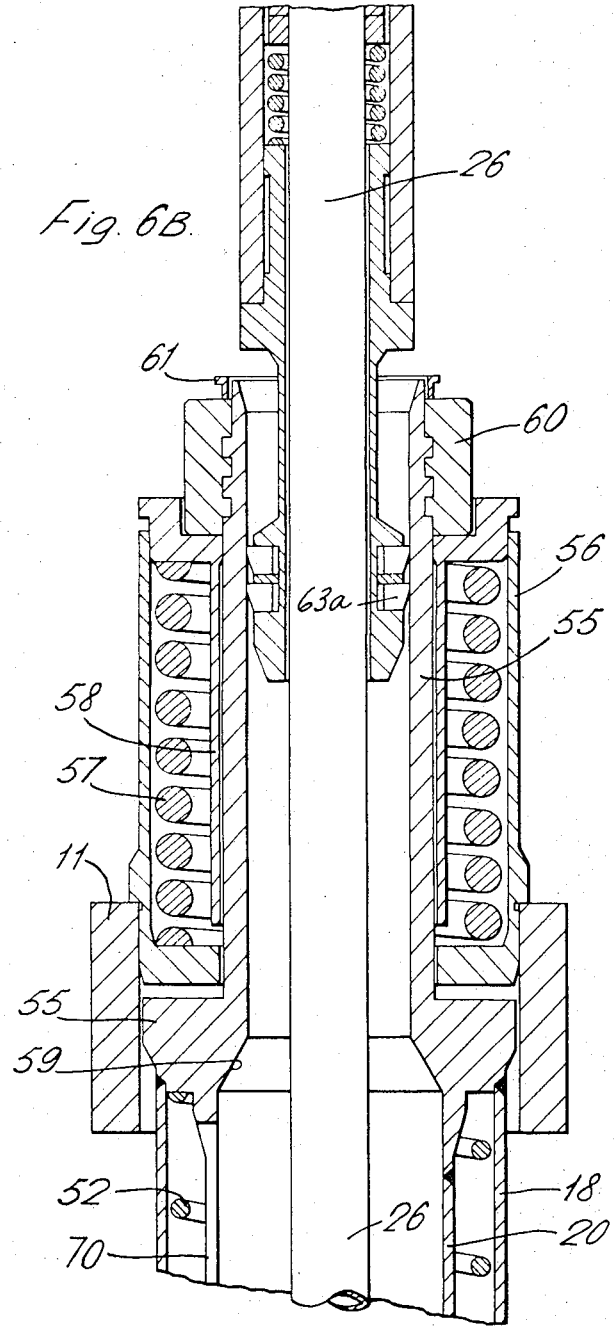

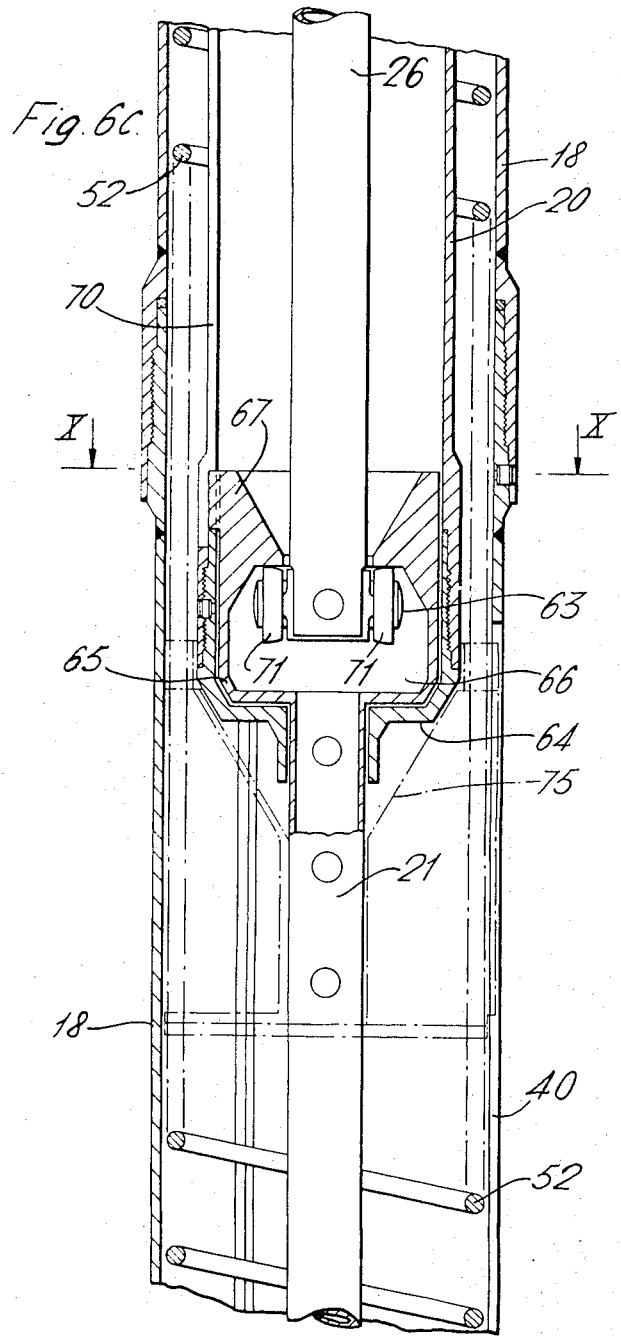

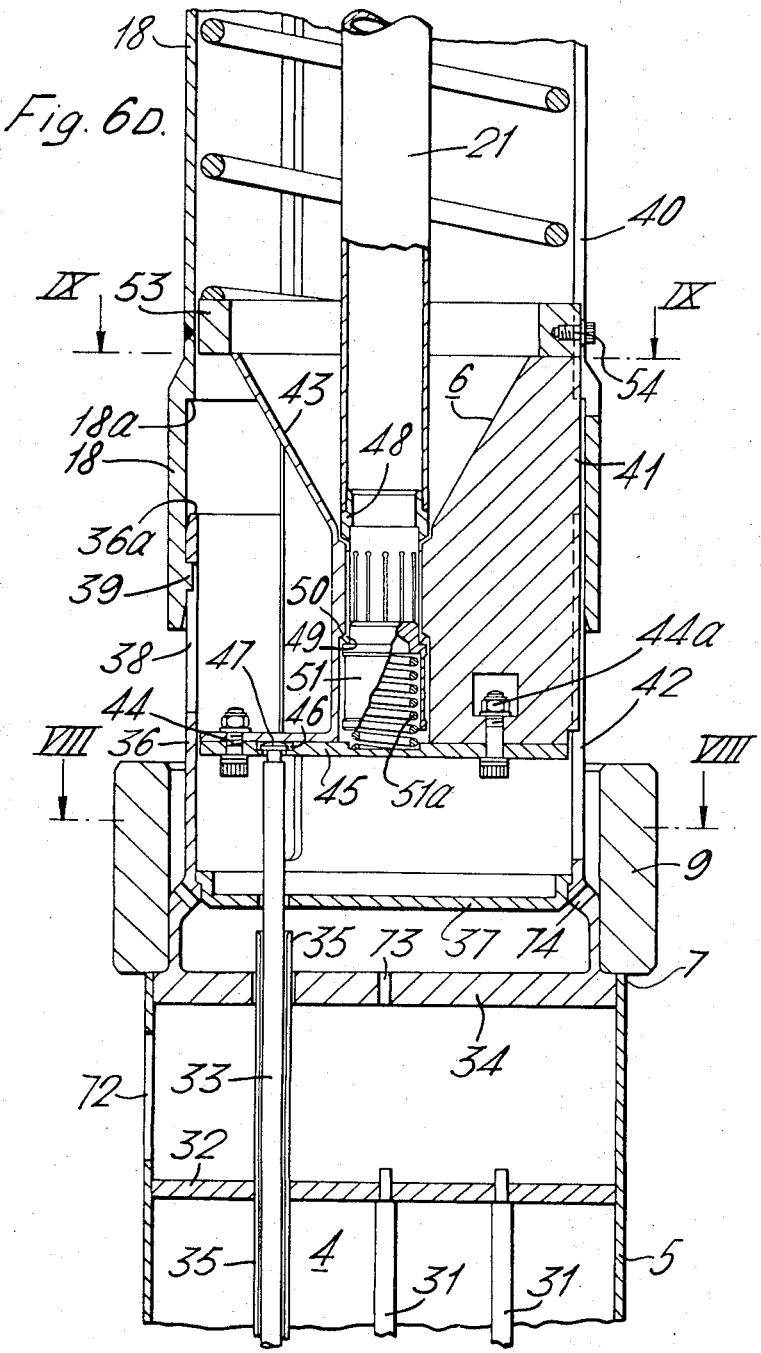

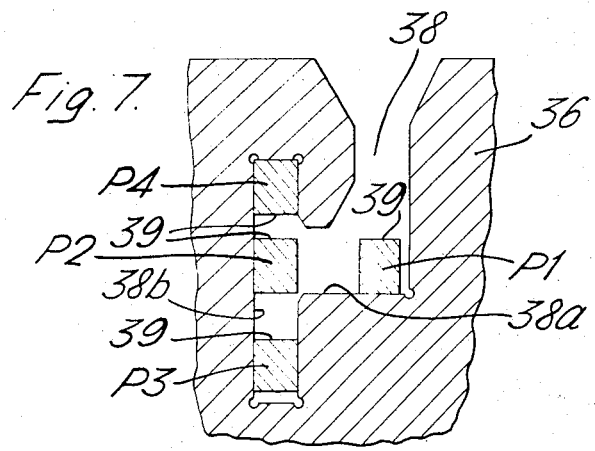
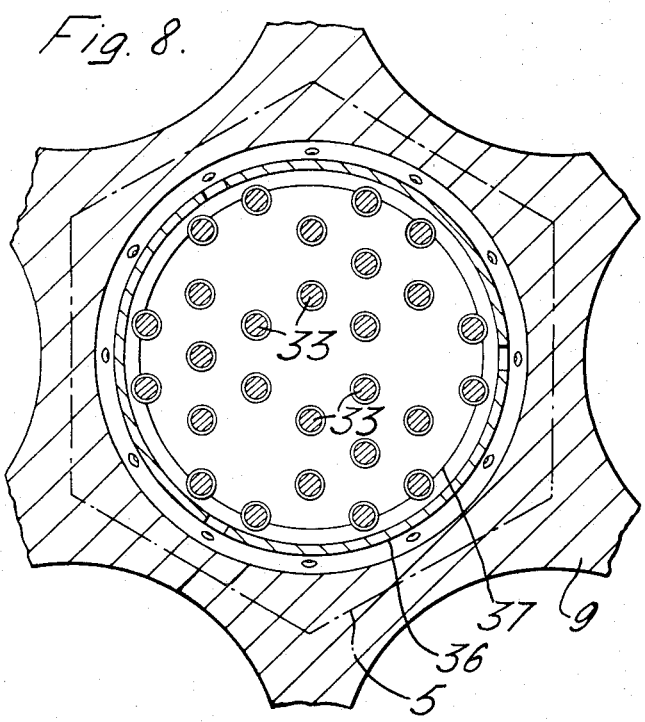

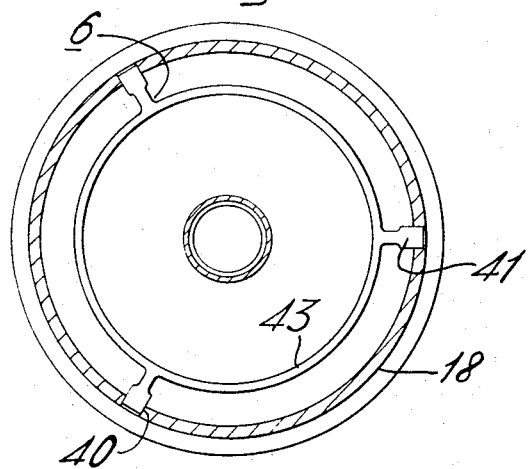
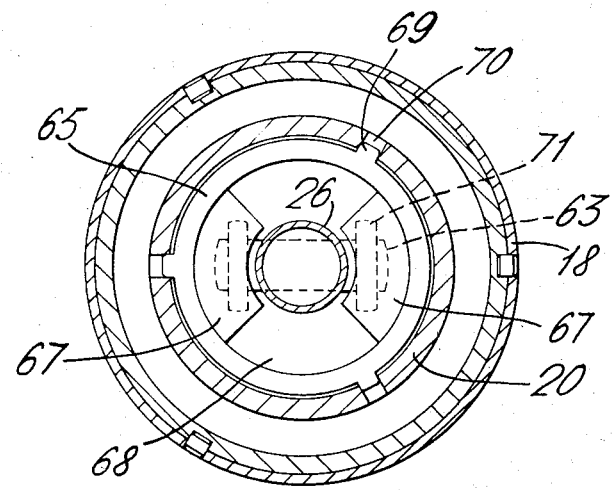

3,356,578
NUCLEAR REACTOR
Peter William Dryland, Cuddington, and Michael Charles
  Pugh, Warrington, England, assignors to United Kingdom Atomic Energy Authority, London, England
Filed Apr. 4, 1966, Ser. No. 539,758
Claims priority, application Great Britain,
  Apr. 29, 1965, 18,159/65
4 Claims. (Cl. 176—40)

---

ABSTRACT OF THE DISCLOSURE

A nuclear reactor comprising a vertically elongate pressure vessel having an upper end, a lower end and a middle, a reactor core located in the lower end of the vessel and including a number of fuel assemblies each containing at least one relatively displaceable control pin of a material which affects the neutron flux in its vicinity, and control mechanisms substantially aligned with the fuel assemblies for displacing the control pins within their respective fuel assemblies, is provided with an upper core support grid assembly, a lower core support grid assembly, and fuel assembly raising devices supported in the upper end of the pressure vessel above both grid assemblies, each concentric about a control mechanism and engageable with the fuel assembly with which the control mechanism is aligned for the purpose of raising or drawing the fuel assembly against the stop or abutment formed by the upper grid assembly.

---

This invention relates to nuclear reactors, and is concerned more particularly with the construction of reactors designed to have a reactor core to be made up of a number of similar assemblies, each assembly being designed to have an associated control mechanism.

According to the instant invention, a nuclear reactor comprises a vertically elongate pressure vessel having an upper end, a lower end and a middle, a reactor core located in the lower end of the vessel and comprising a number of fuel assemblies, each containing at least one relatively displaceable control pin of a material which affects the neutron flux in its vicinity, control mechanisms substantially aligned with the fuel assemblies for displacing the control pins within their respective fuel assemblies, an upper core support grid assembly, and fuel assembly raising devices supported in the upper end of the pressure vessel above both grid assemblies, each concentric about a control mechanism, and engageable with the fuel assembly with which the control mechanism is aligned for pulling the fuel assembly against the upper grid assembly. Preferably the upper grid assembly itself comprises upper and lower grids and the fuel assembly raising devices are supported by the upper grid and pull the fuel assemblies against the lower grid. The fuel assemblies preferably are attached to the raising devices adjacent the support grid against which they are held, the attachment being, for instance, by a bayonet-type coupling. The raising devices preferably further include a combined pre-tensioning and locking device.

In the accompanying exemplifying drawings:

FIGURES 1 to 5 show in partly diagrammatic form various stages in the construction of a nuclear reactor in accordance with the invention, FIGURE 6 is an enlarged sectional view of part of FIGURE 5, shown for convenience as four successive portions A, B, C and D, FIGURE 7 is an enlarged view of a detail of FIGURE 6, FIGURE 8 is a section on the line VIII—VIII of FIGURE 6, FIGURE 9 is a section on the line IX—IX of FIGURE 6, and FIGURE 10 is a section on the line X—X of FIGURE 6.

The nuclear reactor described below is an integral, pressurised water nuclear reactor, that is to say having both a reactor core and a heat exchanger in a single pressure vessel, and cooled and moderated by pressurised water. For the purpose of describing the present invention (which of course is not limited to this particular type of reactor), the figures are simplified by omission of details of the heat exchanger and coolant flow circuit components. For a general indication of the disposition of such components, reference may be made for example to Figure 2 of the article "Safety in Nuclear Ships" appearing in "Atom," Number 101 of March 1965.

FIGURE 1 shows a pressure vessel 1 housing a thermal shield and core box 2, and a lower core locating grid 3. At this stage of construction, the heat exchanger and flow circuit components have been installed, and FIGURE 1 shows one assembly 4 located in an aperture in and temporarily supported by the grid 3. The assembly 4 comprises a sleeve or shroud 5 housing fixed fuel elements or pins and movable control elements or pins, to be described hereinafter, the fuel elements or pins being mounted in fixed position within the sleeve, and the control elements or pins being flexibly linked to a common carrier 6 normally axially movably within the sleeve 5 (but restrained against rotation) during reactor operation. The sleeve 5 has a shoulder 7 and is fitted with a helmet or cap 8 which holds the carrier 6 in the sleeve 5 during handling of the assembly 4 and also provides a lifting point as well as serving as a guide. A number of assemblies similar to the assembly 4 are positioned in the same way to form a reactor core.

FIGURE 2 shows additional components in the form of an upper core supporting grid assembly consisting of an upper core support grid 9, a tubular main support structure 10 and a control mechanism support grid 11. From the stage shown in FIGURE 1, the grid 9 is first guided over the caps 8 and positioned to locate on top of the shield 2 by way of integral downwardly extending flange 12 on the grid 9, but with the grid 9 clear of the shoulder 7. The structure 10 is then lowered into the vessel to be fixed to and located by an integral upstanding flange 13 on the grid 9. The grid 11 is then mounted in the vessel by way of an integral stepped flange 14 fastened to upper flanged end 15 of the vessel 1, to arrive at the stage shown in FIGURE 2, it being noted that there is clearance between upper flanged end 16 of the structure 10 and the corresponding peripheral recess on the underside of the grid 11.

FIGURE 3 shows the next construction stage in which tie rods 17 (one of which is shown) extend between the grids 9, 11 and are used to lift the grid 9 so that its flange 12 is clear of the top of the shield 2 and at the same time clamp the grid 9 and the structure 10 to the grid 11 taking up the clearance between the end 16 and the corresponding recess. The grid 9 although not now supported by the shield 2 is still located by it by way of a keying arrangement (not shown) between the flange 12 and the shield 2. The helmets 8 are now removed in preparation for the next step in the construction of the reactor, their design ensuring that on removal the carriers 6 remain in the shrouds 5.

FIGURE 4 shows a tubular housing 18 of a control mechanism to be associated with the assembly 4. The housing 18 is lowered into the vessel and through an aperture in the grid 11 and locked to the sleeve 5 as shown at locked joint 19 (to be described in greater detail hereinafter) in the region of the grid 9. The control mechanism further comprises a dashpot 20 mounted in the housing 18, the dashpot housing an axially movable piston 21 therein (the piston being restrained against rotation) which is shown releasably connected at its lower end to the carrier 6. Housings similar to the housing 18 are then fitted in the same way to all the assemblies forming the core.

To arrive at the completed nuclear reactor construction as illustrated in FIGURE 5, the following stages are performed. The assembly 4 and its locked housing 18 are lifted, pre-tensioned and supported from the grid 11 by a combined pre-tensioning and locking device 22 (to be described in more detail later). The assembly 4 is held against the grid 9 so that the shoulder 7 abuts the grid 9. The grid 3 no longer supports the assembly 4 but still locates it against lateral displacement. All the assemblies forming the core and their associated housings are then similarly supported from the grid 11.

A lid 23 is now sealed to the upper flanged end 15 of the vessel. Following this a control mechanism drive system 24 is fitted to pass through the lid 23, the drive system 24 being sealed to the lid at a flange 25. The drive system 24 has a driven member 26 passing through a gland 27 inside the vessel 1, the member 26 having at its lower end a connector 28 for releasable connection to the upper end of the piston 21.

FIGURES 6, 7 and 8 show in greater detail the arrangement of the completed structure of FIGURE 5. The hexagonal shroud 5 houses fuel pins 31 (e.g. UO₂ in stainless steel sheaths) fixed in position between spacer plates (one of which is shown and designated 32) mounted from the shroud, and movable control pins 33 of neutron absorber material such as boron steel insertable between the fuel pins 31. The shroud 5 has a top end fitting 34 perforated (as are the spacer plates 32) for passage of guide tubes 35 for the control pins 33. Whilst the shroud 5 is of hexagonal cross-section, the end fitting 34 has a tubular portion 36 of circular cross-section projecting upwardly through and above the grid 9. This portion 36 supports a plate 37 perforated to allow passage of the control pins 33 and serving as a seat for the carrier 6 and also as a coolant deflector. The portion 36 has bayonet slots 38 for bayonet pins 39 on the housing 18. The slots 38 are shaped so that as the housing 18 is lowered (as described above with reference to FIGURE 4) the pins 39 engage the slots 38 and take up positions P1 (FIGURE 7) on seats 38a of the slots 38. The housing 18 is then rotated until position P2 is reached with the pins 39 abutting faces 38b of the slots 38 and longitudinal keyways 40 in the housing 18 are aligned with keys 41 on the carrier 6 so that further lowering of the housing 18 to position P3 of the pins 39 causes the keys 41 to engage the keyways and seat 18a on the housing 18 abuts seat 36a on the portion 36. During this installation the keys 41 also remain in engagement with keyways 42 in the portion 36 of the assembly 4, and the carrier 6 remains on its seat defined by the plate 37.

The carrier 6 comprises a part-conical tube 43 (FIGURES 6 and 9) having three equi-spaced radially disposed plates effectively forming the keys 41. The tube 43 is outwardly flanged at its lower end and has fastened to it by bolts and nuts 44 and 44a (the latter serving for location during initial construction of the assembly 4) a carrier plate 45 having counter-bored apertures 46 by which domed heads 47 of the control pins 33 are carried, so that the pins 33 are flexibly linked to the carrier 6, that is to say the pins 33 have freedom for rotation and a limited degree of lateral movement relative to the carrier 6, but no freedom for axial movement relative to the carrier 6.

The tubular piston 21 is coaxially disposed in the housing 18 and has fixed to its lower end a tube 48 slotted to define springs 49 which engage a seat 50 on the tube 43, the springs 49 being held in engagement with the seat 50 by a locktube 51 and a lock-spring 51a acting between the plate 45 and the tube 51 so as to connect or secure the piston 21 to the carrier 6.

Disposed in the annulus between the piston 21 and the housing 18 is a main helical scram spring 52 extending between the upper end of the housing 18 and a spring retaining ring 53 shown in FIGURE 6 bearing against the carrier 6. The ring 53 has screws 54 extending through the keyways 40 and during the installation of the housing 18 the spring 52 is retained in the housing 18 since the screws 54 act as stops locating the ring 53 in a position defined by abutment of the screws 54 against the bottom of the keyways 40. The ring 53 is lifted from this position when the keys 41 engage the keyways 40. During the installation with the housing 18 in its lowest position (corresponding to the position P3) the piston 21 is pushed down against the action of the spring 51a to connect to the carrier 6 as described above.

At its upper end the housing 18 has a welded and flanged extension tube 55 (on which the spring 52 bears) extending upwardly through the aperture in the grid 11. To lift, pre-tension and support the assembly 4 and its associated housing 18 from the grid 11 by way of the device 22 as described above with reference to FIGURE 5, an adaptor sleeve 56 is disposed so as to seat on the grid 11 around the aperture, and a pre-tensioning spring 57 is positioned so as to extend between the lower inwardly flanged end of the sleeve 56 and an upper outwardly flanged end of a thrust sleeve 58. During this construction stage the sleeve 58 is held in a jacking tool (not shown) having retractable jaws for engagement with a seat 59 on the inside of the tube 55. With the jaws engaging the seat 59 the tool is operated to jack the assembly 4 and housing 18 upwardly from the position shown in FIGURE 4 to that shown in FIGURES 5 and 6 in which the shoulder 7 bears against the underside of the grid 9. At the same time the tool compresses the spring 57 and locks the sleeve 58 in the position shown in FIGURE 6 by a breech lock 60 and an anti-rotation clip 61, the spring 57 serving to pre-tension the assembly 4 against the grid 9 by way of its associated housing 18.

As the housing 18 is lifted during the jacking stage the piston 21 lifts the carrier 6 from the position shown in FIGURE 4 to that shown in FIGURES 5 and 6, that is to say raised from the seat defined by the plate 37. The keys 41 remain in engagement with both the keyways 40 and 42 and help ensure that the bayonet pins 39 take up their correct final position P4 (FIGURE 7) in the slots 38 giving the locked joint 19, and there is thus precise orientation of the housing 18 with respect to the assembly 4.

FIGURE 6 shows the drive system 24 sealed in passage through the lid 23 at the flange 25. The system 24 has a tube 62 sealing with the inside of the tube 55 by way of sealing rings 63a, the tube 62 housing the gland 27 through which extends the tubular driven member 26. The connector 28 (FIGURE 5) at the lower end of the driven member 26 is shown in FIGURES 6 and 10 in the form of a hammerhead 63 or in other words a transverse shaft. The tubular dashpot 20 extends downwardly from the lower end of the tube 55 and is inwardly flanged at its lower end 64 to form a seating for enlarged upper end 65 of the piston 21. The end 65 is shaped to define a circular socket 66 with opposed upper flanges 67 defining a diametral slot 68 giving access to the socket 66. The end 65 also has keys 69 engaging longitudinal keyways 70 in the dashpot 20.

To effect connection between the member 26 and the piston 21, the member 26 is driven downwardly, the hammerhead 63 is aligned with the slot 68, the member 26 is driven downwardly further until the hammerhead 63 enters the socket 66, and the member 26 is then rotated through 90° to the position shown in FIGURES 6 and 10 with rollers 71 on the hamerhead 63 engaging the flanges 67.

During normal reactor operation, coolant flows upwardly through the assembly 4, the main portion leaving the shroud 5 by way of ports 72. A minor coolant portion flows through ports 73 in the end fitting 34 to be deflected by the plate 37 to flow through ports 74 in the portion 36 thus providing a flow of coolant over the grid 9. Normal reactor control is effected by way of axial movement of the control pins 33 relative to the fuel pins 31 by axial movement of the carrier 6, piston 21 and driven member 26, and dotted outline 75 represents the upper limit of movement of the carrier 6.

In the construction of nuclear reactor described above by way of example, the assemblies such as the assembly 4 are placed in vessel 1, the two spaced support grids such as the grids 9, 11 are then mounted in the vessel, the control mechanisms such as the control mechanism comprising the housing 18, dashpot 20, piston 21 and spring 52 are each then locked as by way of the bayonet-type locked joint 19 in the region of the grid 9 to their associated assembly, and the control mechanisms are then supported from the upper grid 11 so as to hold the assemblies against the lower grid 9.

This method of construction offers a number of advantages. Thus during placing of the assemblies in the vessel to form the core the control pins are at all times fully inserted between the fuel pins in a position to effect maximum control. The keys of the carrier engage the keyways in the assembly shroud and the cap or helmet prevents inadvertent removal of the control pins.

The locked joints in the region of the lower one of the two spaced support grids in conjunction with the locking devices provide that differential expansions and contractions between the assemblies and their associated control mechanisms during reactor operation are catered for from a common datum or reference level, effectively that of the lower one of the two spaced support grids. Construction and subsequent servicing is facilitated in that whilst the locked joints are at the level of the lower one of the two spaced support grids they are effectively made by operations at a more readily accessible level, namely that represented by the upper one of the two spaced support grids.

With the control pins fully inserted between the fuel pins and the pistons engaged with the carriers, the keys on the carriers engage the keyways in both the assembly shrouds and the control mechanism housings. The control mechanisms cannot then be disconnected from the assemblies until the carriers have been disconnected from the pistons, since the keys prevent rotation of the housings relative to the shrouds.

During reactor operation, normal control is effected by movement of the control pins to vary the extent of their insertion between the fuel pins by way of axial movement of the pistons under the influence of the driven members which are normally restrained against rotation. For emergency control the driven members are given limited rotation (90°) to disconnect the hammerheads from the pistons, when the main springs drive the carriers downwardly thus fully inserting the control pins to achieve maximum control of the reactivity of the core. The construction provides that any disconnection of the driven members from the pistons gives rapid and complete insertion (under the influence of the main scram springs) of the control pins between the fuel pins.

Such disconnection forms a preliminary stage for removal of the assemblies from the pressure vessel for servicing or refuelling purposes, and is followed by removal of the drive systems and the lid, and unlocking of the locking devices. As described above, before disconnecting the control mechanisms from the assemblies, the carriers have to be disconnected from the pistons. To achieve this a tool is inserted through the tubular piston to push downwardly on the lock-tube and lock-spring and at the same time pull upwardly on the piston to disengage it from the carrier. Access to the assemblies for their removal is then obtained in a manner which is effectively the reverse of the appropriate construction stages described above. This procedure ensures that on removal of the assemblies the control pins are at all times fully inserted between the fuel pins.

We claim:

1. A nuclear reactor comprising a vertically elongate pressure vessel having an upper end, a lower end and a middle, a reactor core located in the lower end of the vessel and comprising a number of fuel assemblies, each containing at least one relatively displaceable control pin of a material which affects the neutron flux in its vicinity, control mechanisms substantially aligned with the fuel assemblies for displacing the control pins within their respective fuel assemblies, an upper core support grid assembly, a lower core support grid assembly, the improvement comprising, fuel assembly raising devices supported in the upper end of the pressure vessel above both grid assemblies, each concentric about a control mechanism, and engageable with the fuel assembly with which the control mechanism is aligned for pulling the fuel assembly against the upper grid assembly.

2. A nuclear reactor according to claim 1 wherein the upper grid assembly itself comprises upper and lower grids and wherein the fuel assembly raising devices are supported by the upper grid and pull the fuel assemblies against the lower grid.

3. A nuclear reactor according to claim 2 wherein the fuel assemblies are attached to the raising devices adjacent the support grid against which they are held.

4. A nuclear reactor according to claim 3 wherein the fuel assemblies are attached to the raising devices by a bayonet-type coupling and the raising devices include a combined pre-tensioning and locking device.

References Cited

UNITED STATES PATENTS

| | | | |
|---|---|---|---|
| 3,158,543 | 11/1964 | Sherman et al. | 176—50 X |
| 3,192,120 | 6/1965 | Campbell | 176—50 |
| 3,194,740 | 7/1965 | Frisch | 176—50 |
| 3,205,144 | 9/1965 | Jabsen | 176—50 |
| 3,212,979 | 10/1965 | Silverblatt | 176—50 X |

REUBEN EPSTEIN, *Primary Examiner.*

CARL D. QUARFORTH, *Examiner.*